United States Patent [19]

Moran

[11] 4,025,233
[45] May 24, 1977

[54] ROTOR FOR WIND-DRIVEN MACHINE

[76] Inventor: Kevin E. Moran, 212 Lippincott Ave., Riverton, N.J. 08077

[22] Filed: Apr. 12, 1976

[21] Appl. No.: 676,535

[52] U.S. Cl. .................................. 416/207; 416/9; 416/214 R
[51] Int. Cl.² .......................................... F03D 1/06
[58] Field of Search .......... 416/206, 202, 204, 205, 416/207, 214, 9, 13, 15

[56] References Cited
UNITED STATES PATENTS

| 457,168 | 8/1891 | Sinclair | 416/13 |
| 1,165,931 | 12/1915 | Akimoff | 416/186 |
| 1,664,183 | 3/1928 | Parker | 416/204 |

FOREIGN PATENTS OR APPLICATIONS

| 1,036,341 | 9/1953 | France | 416/202 |
| 311,712 | 10/1933 | Italy | 416/202 |

Primary Examiner—Everette A. Powell, Jr.
Attorney, Agent, or Firm—Smith, Harding, Earley & Follmer

[57] ABSTRACT

In the rotor of a windmill electric generator, blades are secured to a hub by means of individual tab-receiving slots and a common "knock-off" hubcap, this mounting means providing for rapid assembly and disassembly. The mounting structure itself establishes a predetermined pitch at the blade root, thus permitting the advantages of an optimum twisted blade to be obtained without the need for an excessively complex blade configuration. The result is a compact generator unit that can be used easily in remote areas and stowed with camping equipment.

5 Claims, 4 Drawing Figures

ROTOR FOR WIND-DRIVEN MACHINE

BRIEF SUMMARY OF THE INVENTION

This invention relates to rotors for wind-driven machines such as electric generators, and is particularly adapted for use in relatively small scale wind-driven machines of the kind used to provide auxiliary power for homes, motor homes, vacation homes, off shore oil platforms, boats and the like. In these applications, wind-driven electric generators are typically designed for power levels of 200 to 1,000 or more watts. A typical blade disc diameter for a 500 watt machine is in the vicinity of 9 feet. Consequently, transporting the machine in its assembled condition is usually a practical impossibility.

In order to achieve optimum performance of the wind-driven rotor, the rotor airfoils are desirably twisted so that for each airfoil section, the angle between the chord and the relative velocity vector is within a desired range of angles. The result is that the blade angle (the angle between the chord of an airfoil section and a plane perpendicular to the axis of rotation) decreases in the direction from root to tip of each airfoil. The airfoils, therefore, appear to be twisted, with the blade angle being greatest near the root, and smallest near the tip. In many cases, in order to achieve the desired twist, it is necessary for the airfoils themselves to have a relatively complicated configuration near their roots so that they can be properly secured to a hub.

In accordance with this invention, the problem of difficulty in assembly and disassembly and that of complexity in achieving the desired twist for efficient operation are solved simultaneously by a mounting whereby a plurality of airfoils may be readily secured to and removed from a hub and wherein the airfoil roots, having an elementary configuration, are disposed at the desired angle as a result of the particular hub structure which is used.

One object of the invention is to provide a rotor for a wind-driven machine wherein a plurality of airfoils may be readily attached to and detached from a hub structure so that the wind-driven machine may be easily and readily transported.

Another object of the invention is to provide a rotor which is simple in structure and relatively low in cost and yet possesses the advantages in terms of efficiency which result from the use of twisted airfoils. A typical rotor for a wind-driven machine in accordance with the invention includes a hub, means for mounting said hub for rotation about an axis, a plurality of airfoils mounted on said hub and extending outwardly from said hub in a substantially radial direction with respect to said axis, and means for removably securing the roots of said airfoils to said hub at a predetermined fixed pitch. The means for securing the roots of said airfoils to said hub comprises the following elements:

a. first means on each airfoil adjacent the innermost end of one of the edges thereof for attachment to the hub at a first location thereon at a first radial distance from said axis;

b. second means on each airfoil adjacent the innermost end of the other edge thereof for attachment to the hub at a second location thereon said second location being both radially and axially remote from said first location;

c. first means on said hub for securing the said first means on each airfoil against axial, circumferential and radial outward movement with respect to said hub; and d. second means on said hub for securing the said second means on each airfoil against axial, circumferential and radial movement with respect to said hub, said second means comprising means providing a first radially extending surface on said hub, means providing a second radially extending surface, and cooperating threaded means coaxial with said axis for urging said surfaces toward each other to secure said second means on each airfoil between said surfaces.

The desired blade angle at the root is established simply by positioning the said first means on said hub both axially and radially remote from said second means on said hub.

DETAILED DESCRIPTION

Figure 4:
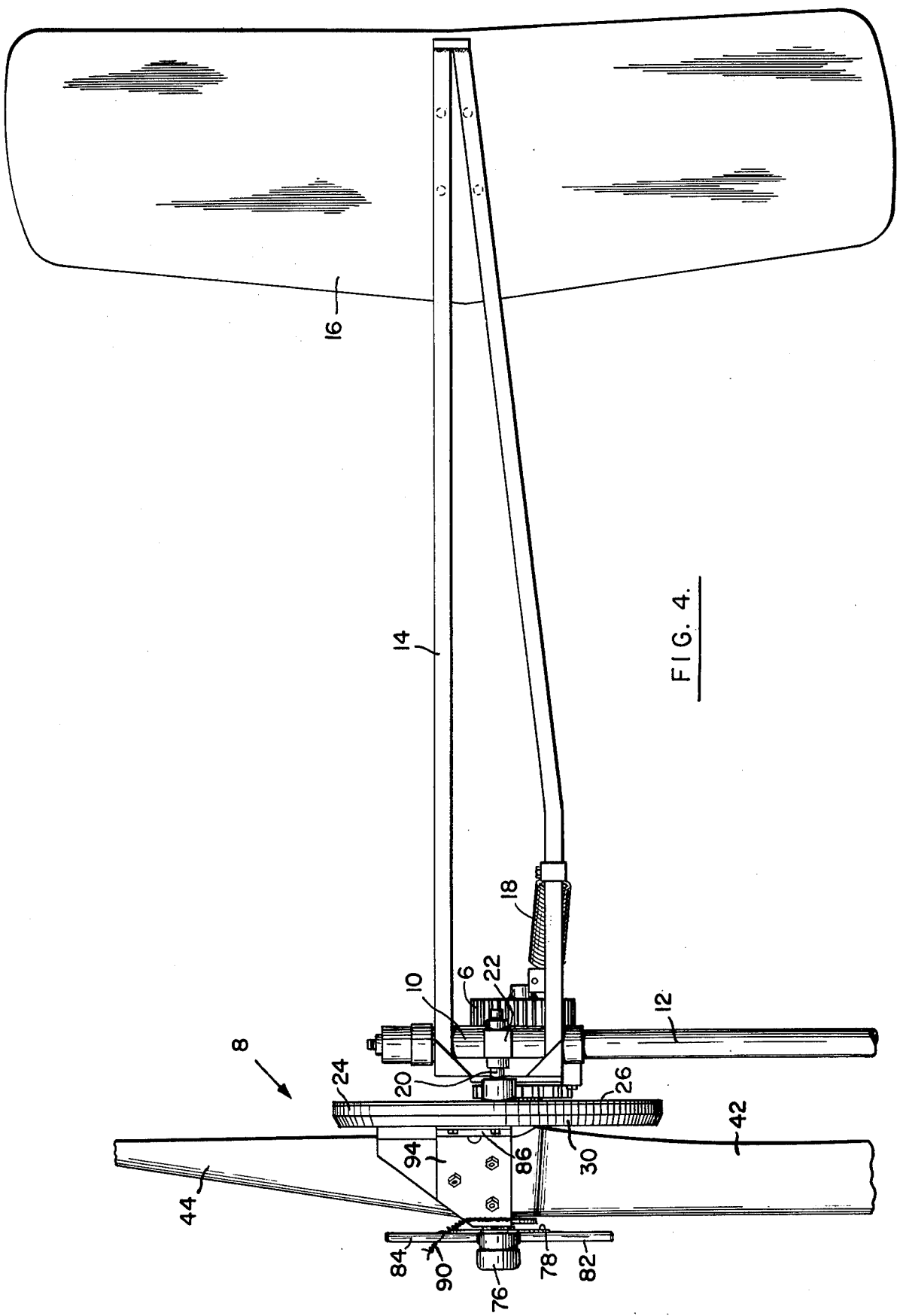
FIG. 4 is a side elevation of a wind-driven machine having a rotor in accordance with the invention.

Referring to FIG. 4, a typical wind-driven machine in accordance with the invention comprises an electric generator 6 and a rotor generally indicated at 8, both the generator and the rotor being mounted on a support or "mainframe" 10. The mainframe is supported on post 12, and is freely rotatable thereon about a vertical axis. A boom 14, having a tail 16, is mounted on the mainframe 10, and is also rotatable about the same vertical axis. The boom and tail structure, however, is rotatable with respect to the mainframe 10, and is connected thereto by a spring 18. Spring 18, in the well known manner, permits the rotor to swing with respect to the boom and tail structure in a heavy wind to avoid damage due to overloading.

The rotor 8 is rotatable on a non-rotating bearing support shaft 20 which extends forwardly from arm 22 on the mainframe. Generator 6 is driven by the rotor through belt 24 which rests in a groove at the periphery of a circular hub plate 26 and, as shown in FIG. 1, extends around a pulley 28 on generator 6.

Figure 1:
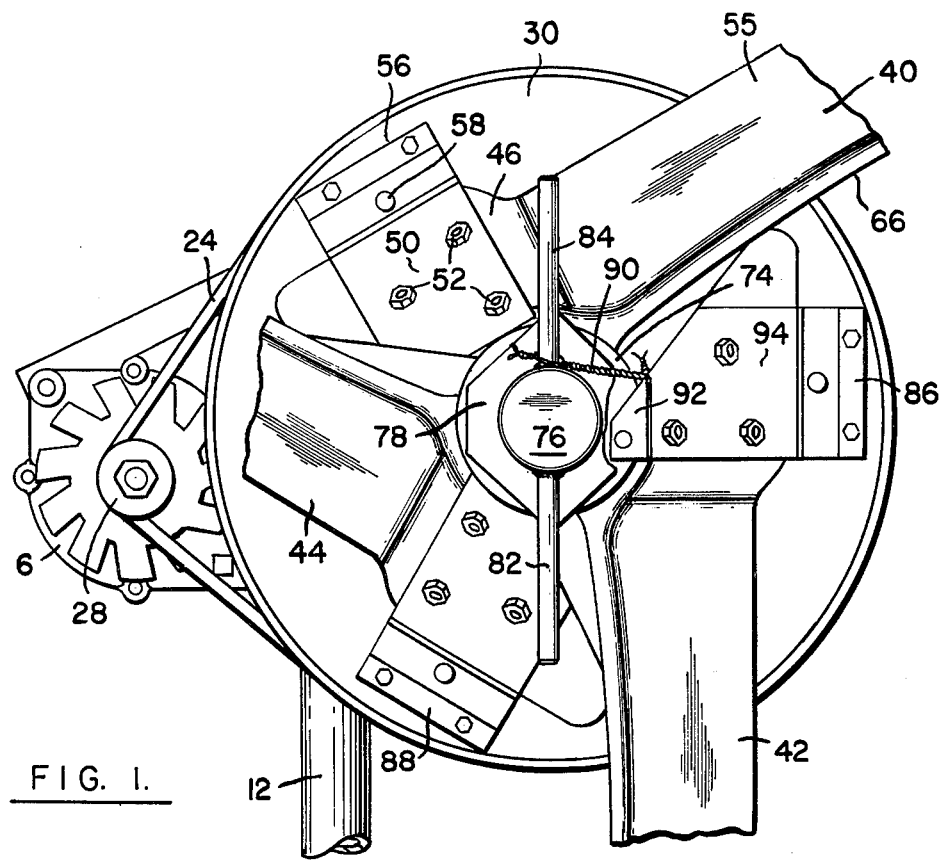
FIG. 1 is a partially cut-away front elevation of a rotor in accordance with the invention, showing the details of the hub, and particularly the means for removably securing the roots of a plurality of airfoils to said hub.
Figure 2:
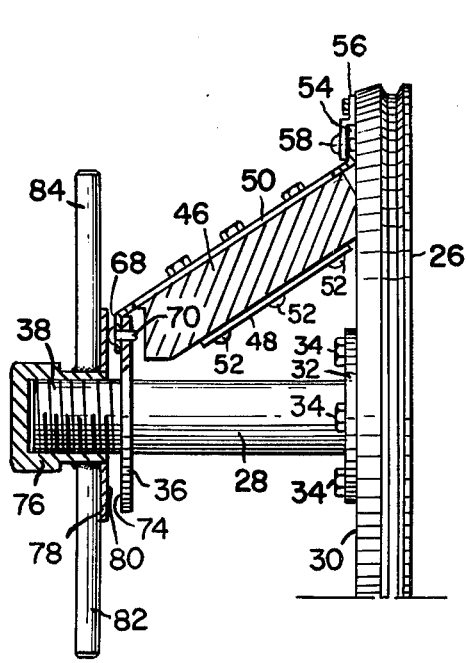
FIG. 2 is a side elevation, partly in section, of the hub structure of the rotor in accordance with the invention, showing a means for removably securing the roots of the airfoils to the hub.

Referring now to FIGS. 1 and 2, the hub of the rotor comprises plate 26 and a cylinder 28 mounted on the front face 30 of plate 26 by means of flange 32 and bolts 34. Cylinder 28 is preferably hollow, and contains the bearings which cooperate with bearing support shaft 20 (FIG. 4). Cylinder 28 is provided with a second flange 36, axially spaced from flange 32, and a threaded extension 38 on the opposite side of flange 36.

As shown in FIG. 1, a plurality of airfoils 40, 42 and 44 are mounted on the hub, and extend outwardly from the hub in a substantially radial direction (that is, substantially perpendicular to the axis of rotation of the hub). The airfoils are preferably made from laminated birch, coated with polyurethane. It will be noted that the airfoil roots are offset from the axis of rotation of the hub.

The manner in which the roots of the airfoils 40, 42 and 44 are removably secured to the hub is best seen in FIG. 2. A thickened portion is provided at the foot of each airfoil, there being a thickened portion 46 at the root of airfoil 40, for example. Thickened portion 46 is clamped between metal plates 48 and 50 by bolts 52. Plate 50 is situated in an oblique relationship with respect to the axis of rotation (the axis of cylinder 28), but has a radially outwardly extending tab 54. This tab is located adjacent the innermost end of the trailing edge 55 (FIG. 1) of airfoil 40, and serves to attach the trailing side of the blade root to the hub. On front face 30 of the hub there is bolted a step-shaped member 56 which is so situated as to provide a slot having an opening facing radially inwardly towards the axis of rotation of the hub and adapted to receive tab 54, as shown in FIG. 2. The slot is defined by face 30 of plate 26 and by the wall of member 56 which is spaced from and faces surface 30. A pin 58, which can be a rivet, extends axially between the walls of the slot and cooperates with a slot 60 (FIG. 3) which extends radially inwardly from the outer edge 62 of tab 54. Slot 60 cooperates with pin 58 to secure tab 54 against circumferential movement. The oppositely facing walls of the slot secure the tab against axial movement. The tab is secured against radial outward movement by the cooperation of pin 58 and slot 60, and also by the cooperation of outer edge 62 of the tab with wall 64 of member 56. As shown in FIG. 1, a similar structure is provided for each of the other airfoils 42 and 44.

Adjacent the innermost end of the leading edge 66 of airfoil 40, plate 50 is provided with an inwardly extending tab 68 (FIGS. 2 and 3) from tab 68, there extends in an axial direction, a projection 70, which is preferably in the form of a pin secured to tab 68. An axially extending opening 72 (FIG. 3) in the radially extending surface 74 of flange 36 is adapted to receive projection 70 so as to secure tab 68 against circumferential movement. An internally threaded member 76 (FIG. 2) is provided with a flange 78 having a surface 80 which opposes surface 74 of flange 36 when the internal threads of member 76 are engaged with the threads of extention 38. A handle comprising a pair of radially extending members 82 and 84 is secured to member 76 so that it can be manually rotated to move surface 80 toward surface 74 in order to secure tab 68 in place by the engagement of surface 80 with the head of the pin having projection 70. Tab 68 is thus secured against axial, circumferential and radial movement with respect to the hub.

The remaining airfoils are mounted on the hub in a manner similar to the manner in which airfoil 40 is mounted. Members 86 and 88, corresponding to member 56, being provided at appropriate locations on the hub. Additional openings corresponding to opening 72 (FIG. 3) are also provided in flange 74. Of course, any desired number of airfoils, greater than two can be mounted on a hub in the manner herein described by appropriate modifications well within the capabilities of persons skilled in the art.

As mentioned previously, plate 50 is disposed in an oblique relationship with respect to the axis of rotation of the hub. This oblique relationship exists by virtue of the fact that the means on the hub which secures tab 54 in place is both radially and axially remote from the means on the hub which secures tab 68 in place. Tabs 54 and 68 are therefore both radially and axially remote from each other and plate 50 and the root 46 of airfoil 40 are oblique with respect to the axis of rotation of the hub. The airfoil sections near the root are thus disposed at the proper blade angle by an extremely simple mounting structure. At the same time, the blade structure is also very simple, and therefore blade replacement is relatively inexpensive.

Figure 3:
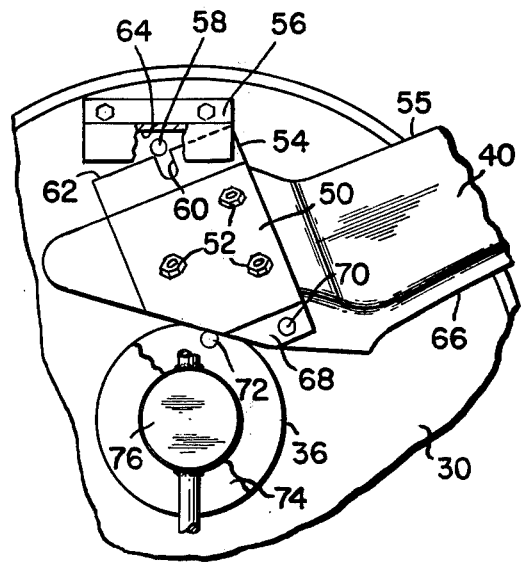
FIG. 3 is a front elevational view of a hub in accordance with the invention, showing an airfoil being placed in position on the hub and illustrating the manner in which airfoils are attached and removed from the hub.

Referring to FIG. 3, an airfoil 40 is installed simply by inserting tab 54 within the slot presented by member 56 in such a way that pin 58 enters slot 60 in tab 54. The blade is then rotated until projection 70 registers with opening 72. The remaining airfoils are similarly installed in their respective mountings, and member 76 is engaged with the threads on extension 38 and tightened against the heads of the pins corresponding to the pin having projection 70. One virtue of the construction shown is that all of the blades can be set in place, and will remain in place while member 76 is being installed.

When member 76 is finally tightened, a safety wire 90 is preferably tied between the handle of threaded member 76 and one of the leading edge tabs, for example a tab 92 on plate 94 (FIG. 1).

The rotor is disassembled simply by removing the safety wire, rotating member 76 in a counterclockwise direction as it is shown in FIG. 1, removing member 76, and twisting the airfoils in a direction such that the projections corresponding to projection 70 are released from openings corresponding to opening 72.

I claim:

1. A rotor for a wind-driven machine including a hub, means for mounting said hub for rotation about an axis, a plurality of airfoils mounted on said hub and extending outwardly from said hub in a substantially radial direction with respect to said axis, and means for removably securing the roots of said airfoils to said hub at a predetermined fixed pitch, said securing means comprising:

first means on each airfoil adjacent the innermost end of one of the edges thereof for attachment to the hub at a first location thereon at a first radial distance from said axis;

second means on each airfoil adjacent the innermost end of the other edge thereof for attachment to the hub at a second location thereon said second location being both radially and axially remote from said first location;

first means on said hub for securing the said first means on each airfoil against axial, circumferential and radial outward movement with respect to said hub; and second means on said hub for securing the said second means on each airfoil against axial, circumferential and radial movement with respect to said hub, said second means comprising means providing a first radially extending surface on said hub, means providing a second radially extending surface, and cooperating threaded means coaxial with said axis for urging said surfaces toward each other to secure said second means on each airfoil between said surfaces; and said first means on said hub being both axially and radially remote from said second means on said hub.

2. A rotor according to claim 1 in which said first means on said hub for securing the said first means on each airfoil against axial, circumferential and radial outward movement comprises means providing a slot having an opening located at a radial distance from said axis, said opening facing radially inwardly toward said axis and being adapted to receive a radially extending tab on an airfoil, said slot being defined at least by a pair of axially spaced walls.

3. A rotor according to claim 2 in which said first means on each airfoil comprises a radially outwardly extending tab having a slot extending radially inwardly from the outer edge thereof, and in which said first means on said hub includes axially extending pin means adapted to enter the last-mentioned slot to secure the tab having said slot against circumferential movement.

4. A rotor according to claim 1 in which said first radially extending surface on said hub is provided with at least one axial opening for each airfoil, and in which each airfoil is provided with an axial projection extending through an axial opening in said hub, said openings and axial projections serving to secure said second means on each airfoil against circumferential movement.

5. An airfoil according to claim 1 in which said airfoils are twisted.

* * * * *